(12) United States Patent
Jin et al.

(10) Patent No.: US 11,954,573 B2
(45) Date of Patent: Apr. 9, 2024

(54) CONVOLUTIONAL NEURAL NETWORK USING ADAPTIVE 3D ARRAY

(71) Applicant: Black Sesame Technologies Inc., San Jose, CA (US)

(72) Inventors: Xiangdong Jin, Mountain View, CA (US); Fen Zhou, Fremont, CA (US); Chengyu Xiong, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 739 days.

(21) Appl. No.: 16/286,323

(22) Filed: Feb. 26, 2019

(65) Prior Publication Data

US 2020/0082242 A1 Mar. 12, 2020

Related U.S. Application Data

(60) Provisional application No. 62/727,929, filed on Sep. 6, 2018.

(51) Int. Cl.
*G06N 3/04* (2023.01)
*G06N 3/063* (2023.01)

(52) U.S. Cl.
CPC .............. *G06N 3/04* (2013.01); *G06N 3/063* (2013.01)

(58) Field of Classification Search
CPC .................................. G06N 3/04; G06N 3/063
See application file for complete search history.

(56) References Cited

U.S. PATENT DOCUMENTS

| 4,194,234 | A | 3/1980 | Geissler |
| 9,110,355 | B1 | 8/2015 | Nourbakhsh |
| 2014/0244981 | A1* | 8/2014 | Okada ................. G06F 15/7867 712/220 |
| 2016/0342893 | A1 | 11/2016 | Ross et al. |
| 2018/0031698 | A1* | 2/2018 | Wang ..................... G01S 7/003 |

(Continued)

FOREIGN PATENT DOCUMENTS

| CN | 102709457 | 10/2012 |
| CN | 106599883 | 4/2017 |

(Continued)

OTHER PUBLICATIONS

Wikipedia. Multiply-accumulate operation. Apr. 27, 2017. (Year: 2017).*

(Continued)

*Primary Examiner* — Alexey Shmatov
*Assistant Examiner* — Robert Bejcek, II
(74) *Attorney, Agent, or Firm* — Shun Yao; Yao Legal Services, Inc.

(57) ABSTRACT

A method of constructing an adaptive multiply accumulate layer in a convolutional neural network, including determining an activation data map width, an activation data map height, a channel depth, a batch, a kernel width, a kernel height and a filter set number, setting a first dimension of an adaptive multiplier layer based on the activation data map width, setting a second dimension of the adaptive multiplier layer based on the channel depth, setting a third dimension of the adaptive multiplier layer based on the filter set number and constructing the adaptive multiplier layer based on the first dimension, the second dimension and the third dimension.

14 Claims, 6 Drawing Sheets

(56) References Cited

U.S. PATENT DOCUMENTS

| | | | |
|---|---|---|---|
| 2018/0046906 A1* | 2/2018 | Dally | G06N 3/04 |
| 2018/0135815 A1 | 5/2018 | Rowles et al. | |
| 2019/0121392 A1 | 4/2019 | Spevak | |
| 2019/0244095 A1* | 8/2019 | Huang | G06F 9/5011 |

FOREIGN PATENT DOCUMENTS

| | | |
|---|---|---|
| CN | 106940815 | 7/2017 |
| CN | 107454966 | 12/2017 |
| CN | 107862378 | 3/2018 |
| CN | 107909646 | 4/2018 |
| CN | 107993186 | 5/2018 |
| CN | 108150922 | 6/2018 |
| CN | 108267909 | 7/2018 |
| CN | 207752279 | 8/2018 |
| CN | 111174155 | 5/2020 |
| CN | 210954562 | 7/2020 |
| WO | 2016186801 | 11/2016 |
| WO | 2016186811 | 11/2016 |

OTHER PUBLICATIONS

Junyang Zhang etc., Parallel Computing Method for Two-Dimensional Matrix Convolution, Mar. 15, 2018, Journal of Zhejiang University(Engineering Edition), Issue 3.

Zijian Yu etc., FPGA-based Accelerator for Convolutional Neural Network, Jan. 31, 2017, Computer Engineering.

Junyang Zhang etc., Design and Implementation of Two-Dimensional Matrix Convolution based on Vector Processor, Jun. 28, 2018, Journal of National University of Defense Technology, vol. 40 No. 3.

Qi Liu etc., convolution-based Detection Models Acceleration based on GPU, May 15, 2016, Computer Applications and Software, vol. 33 No. 5.

Jiajun Li etx., SmartShuttle: Optimizing Off-Chip Memory Accesses for Deep Learning Accelerators, Apr. 23, 2018, IEEE.

* cited by examiner

Operation:

$$F_O(x,y,n) = \sum_{d=0}^{D-1} \sum_{k=-K}^{K} \sum_{k=-K}^{K} W(k,k,d) * F_I(x+k, y+k, d) \ \forall x \in X, y \in Y, n \in N$$

Implementation as 8 nested loops:

| | |
|---|---|
| Batch → | for (b=0; b<B; b++) |
| Layers → | for (l=0; l<L; l++) |
| Filter set → | for (n=0; n<N; n++) |
| Ifmap height → | for (y=0; y<H; y++) |
| Ifmap width → | for (x=0; x<W; x++) |
| | $F_O(x,y,n) = 0$ |
| Channel depth → | for (d=0; d<D; d++) |
| Kernel width → | for (ky=0; ky<KY; ky++) |
| Kernel height → | for (kx=0; kx<KX; kx++) |
| | $F_O(l,b,x,y,n) \mathrel{+}= WI_{b,n}(kx,ky,d) * FI(l,b,x+kx, y+ky, d)$ |

CONVOLUTIONAL NEURAL NETWORK USING ADAPTIVE 3D ARRAY

BACKGROUND

Technical Field

The instant disclosure is related to convolutional neural networks and specifically improving computation efficiency of multiply accumulate.

Background

Convolution layer processing is multi-dimensional (4-D) by nature. The 4 dimensions of activation data are activation data map width (W), activation data map height (H), channel depth (D) and batch (B), the 4 dimensions of corresponding filter weights are kernel width (Ky), kernel height (Kx), channel depth (D) and number (N). To calculate the final convolution output, eight layers of nested loops are utilized. If one batch of input is processed and one layer's output, six nested layers of loops are utilized W×H×D×Ky×Kx×N.

SUMMARY

A first example method of constructing an adaptive multiply accumulate layer in a convolutional neural network, including at least one of determining an activation data map width, an activation data map height, a channel depth, a batch, a kernel width, a kernel height and a filter set number, setting a first dimension of an adaptive multiplier layer based on the activation data map width, setting a second dimension of the adaptive multiplier layer based on the channel depth, setting a third dimension of the adaptive multiplier layer based on the filter set number and constructing the adaptive multiplier layer based on the first dimension, the second dimension and the third dimension.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
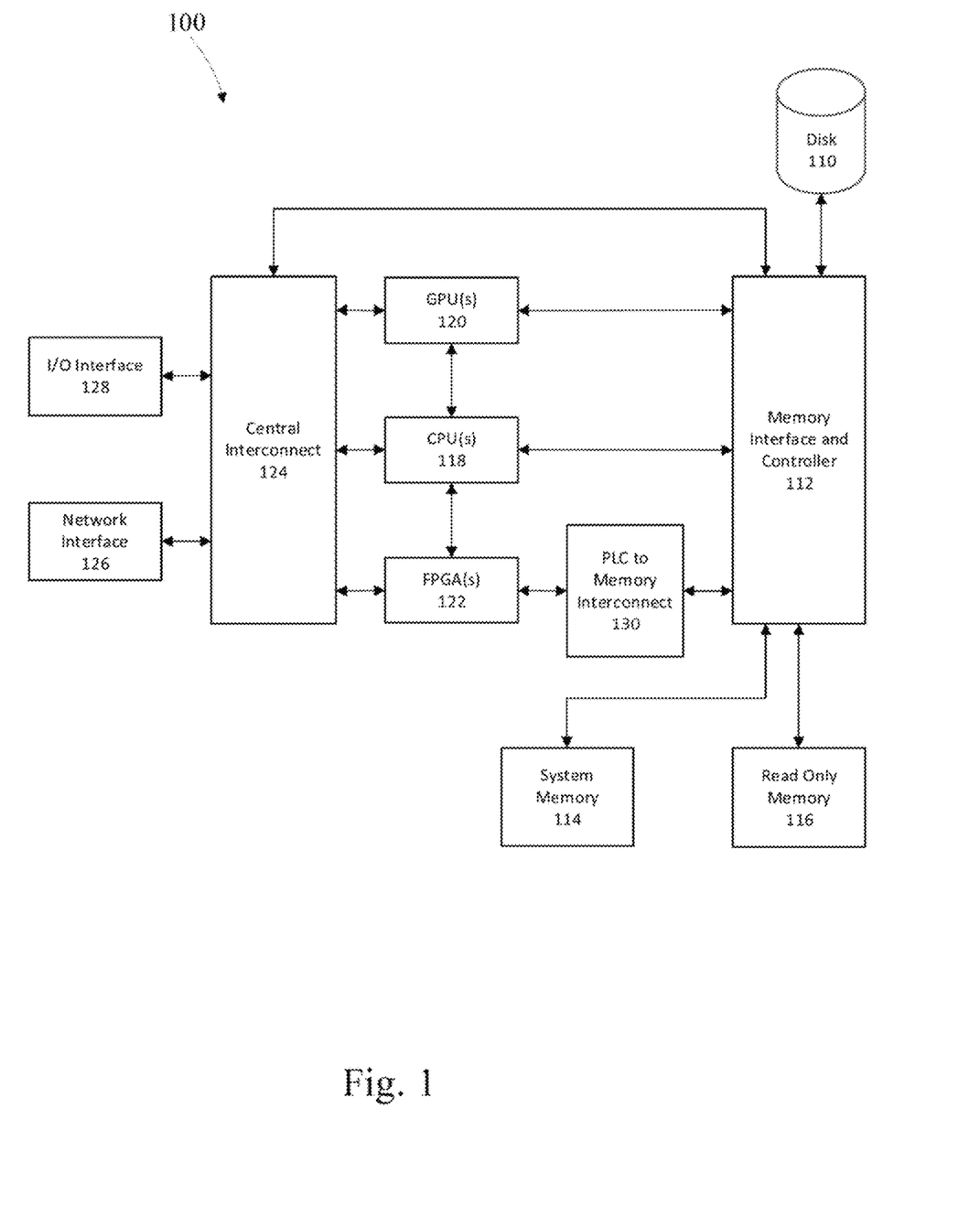
FIG. 1 is a first example system diagram in accordance with one embodiment of the disclosure.
Figure 6:
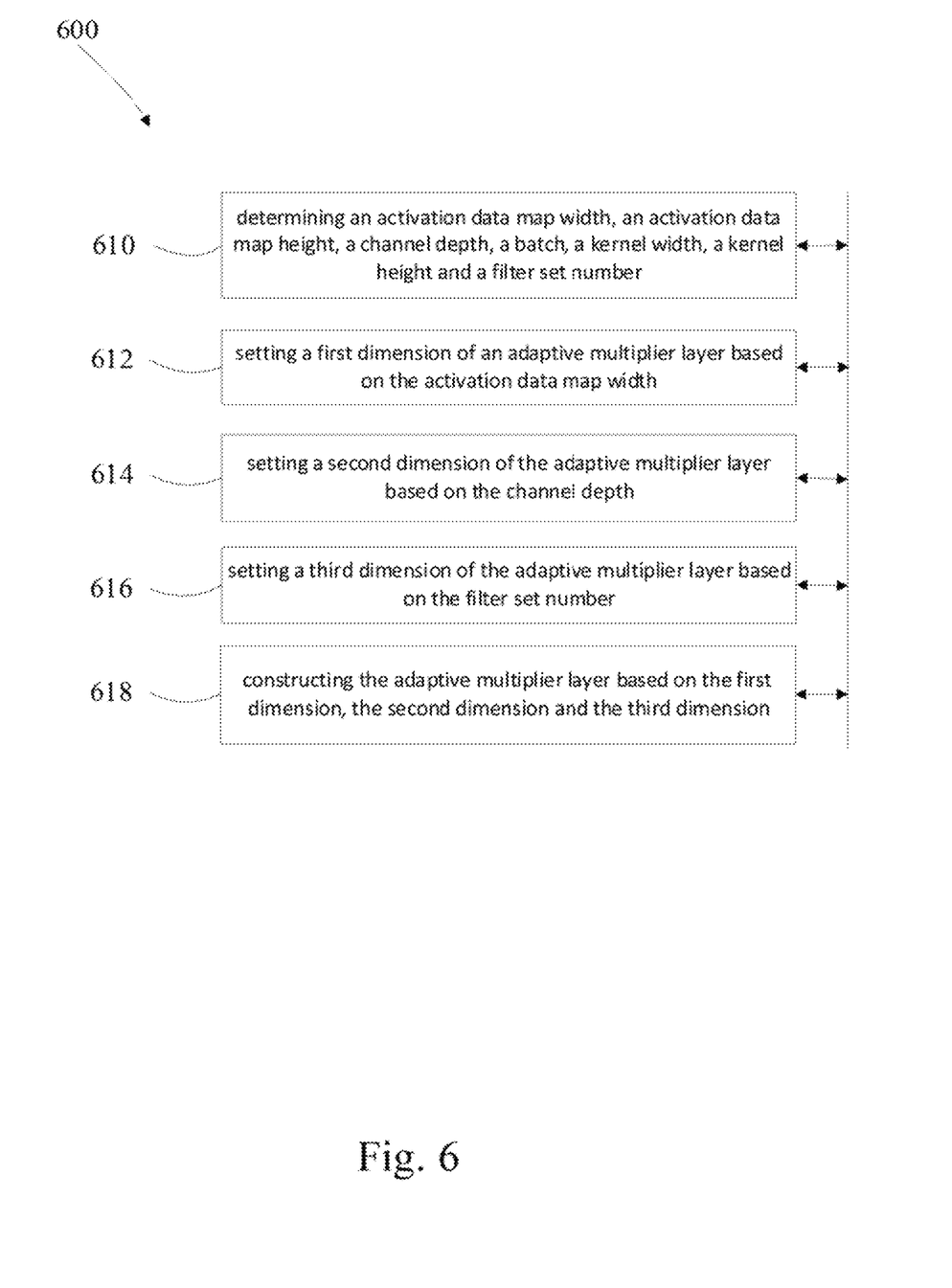
FIG. 6 is an example method of adaptive multiply accumulate in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a field programmable gate array (FPGA) 122, a graphical processor unit (GPU) 120 and a central processing unit (CPU) 118.

Each of the processing units 118, 120 and 122 has the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to each other and are connected to a memory interface and controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
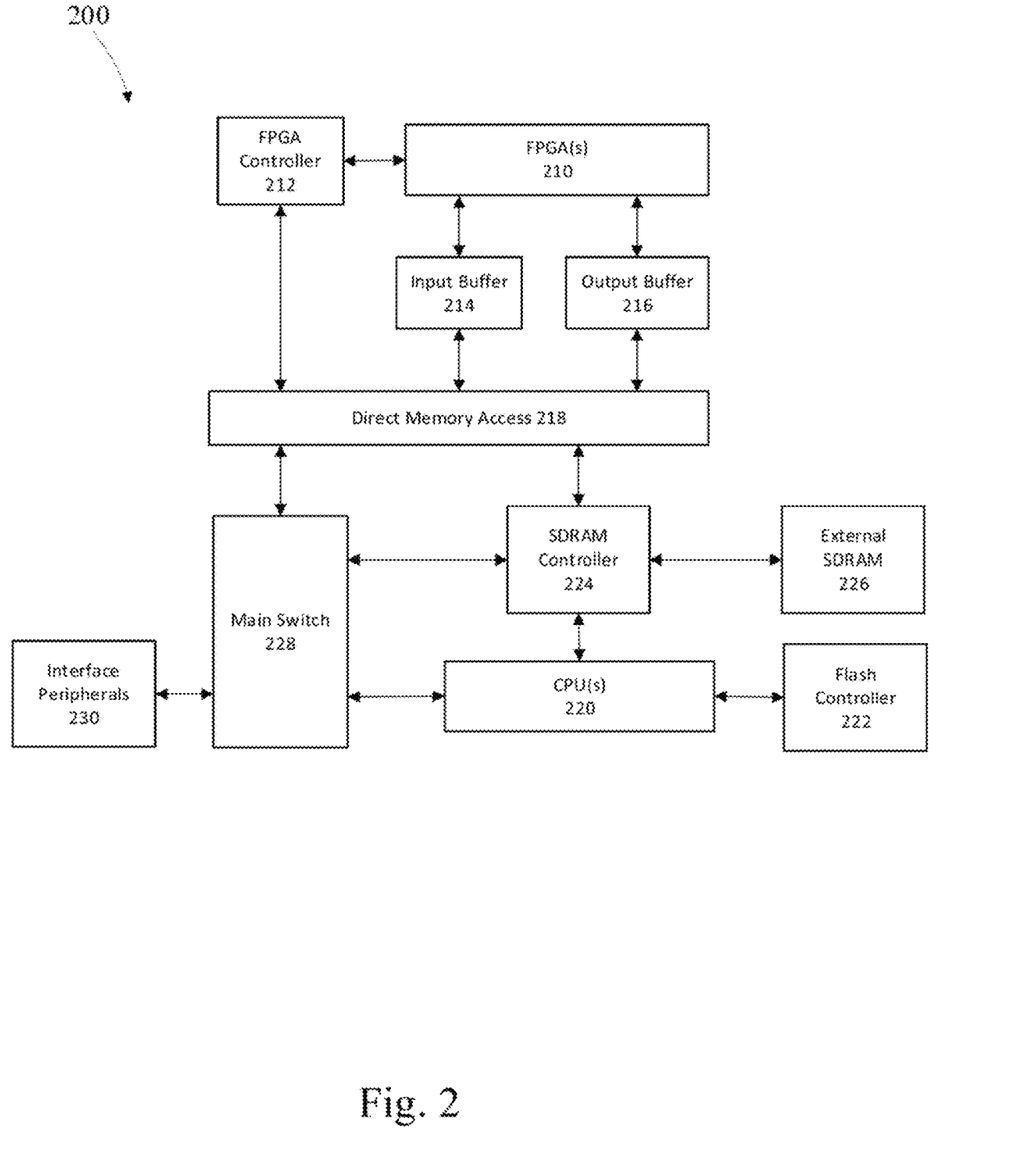
FIG. 2 is a second example system diagram in accordance with one embodiment of the disclosure.

FIG. 2 depicts a second example hybrid computational system 200 that may be used to implement neural nets associated with the operation of one or more portions or steps of process 600. In this example, the processors associated with the hybrid system comprise a field programmable gate array (FPGA) 210 and a central processing unit (CPU)220.

The FPGA is electrically connected to an FPGA controller 212 which interfaces with a direct memory access (DMA) 218. The DMA is connected to input buffer 214 and output buffer 216, both of which are coupled to the FPGA to buffer data into and out of the FPGA respectively. The DMA 218 consists of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

In cases where a multiply accumulator (MAC) with low performance is acceptable a small 1-D vectored single instruction multiple data (SIMD) or 2-D general matrix multiply (GEMM) may be efficiently utilized.

Single-instruction multiple-data (SIMD) units utilize data level-parallelism to solve basic linear algebra subroutines (BLAS) for matrix multiplication. SIMD type units have throughput which doubles as the bit width is halved. With respect to SIMD, the number neural network layers has increased, thus increasing the number of matrix multiplications which has increased the execution time, memory and workload respectively.

General matrix multiply (GEMM) is also implemented in basic linear algebra (BLAS) subroutines. GEMM may multiply two two-dimensional input arrays M×N and N×K and returns a two-dimensional output array of M×K. GEMM iterates over the input arrays and applies Multiply-Accumulate (MAC) operations.

Activation data dimensions may be described as having an activation data map width (W), an activation data map height (H), where (W) and (H) form a two dimensional activation data area map (W×H). The addition of channel depth (D), changes the activation data area map to an activation data volume of (D×W×H). A batch (B) is a collection of (W×H×D) activation data volumes.

Figure 3:
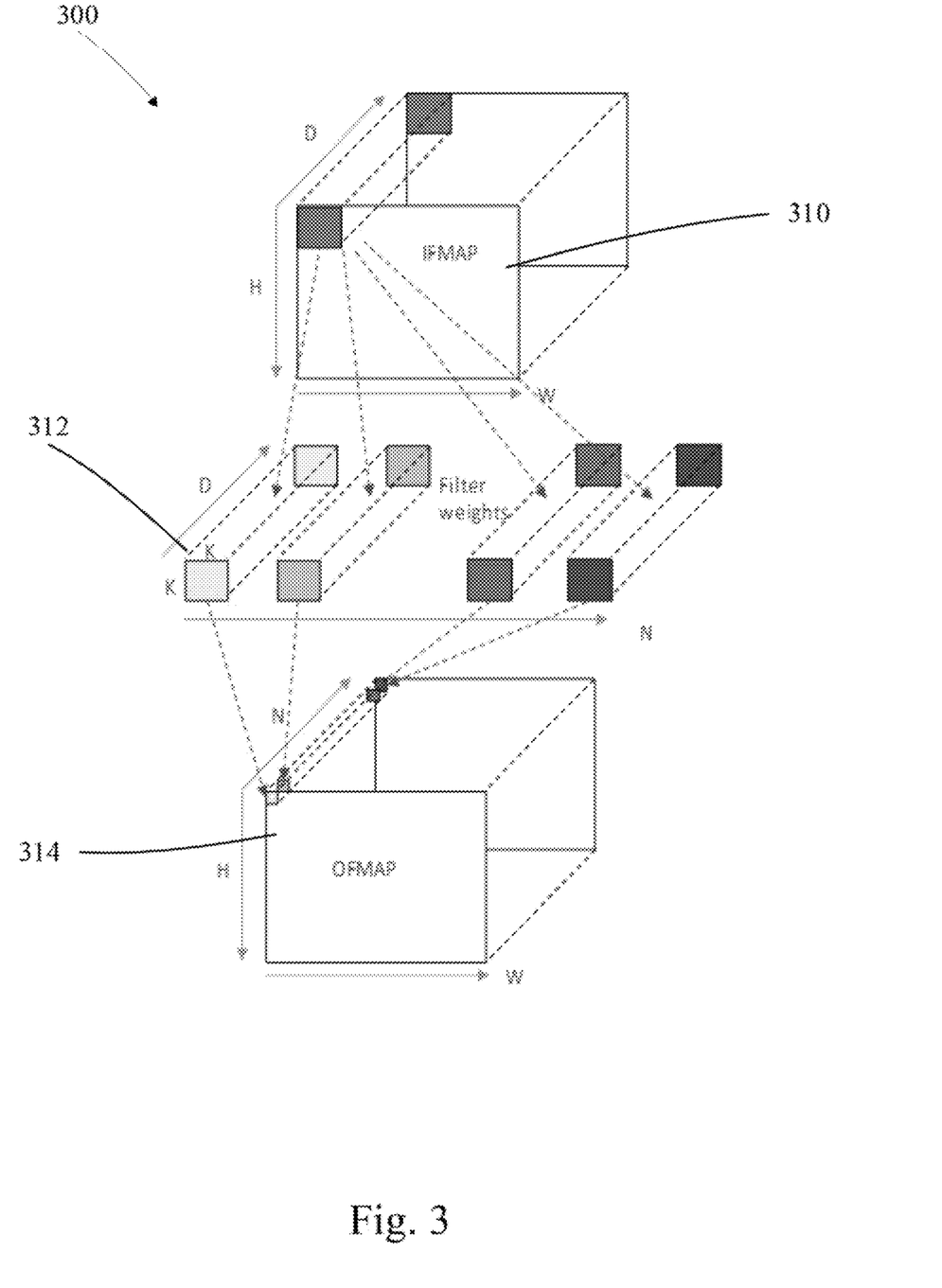
FIG. 3 is an example adaptive multiply accumulate in accordance with one embodiment of the disclosure.

FIG. 3 depicts one example of an activation data and kernel configuration 300. The input feature map (IFMAP) noted as 310 is the activation data map width (W), activation data map height (H) and channel depth (D). The filters 312 have a kernel width (Kx), kernel height (Ky) and channel depth (D) iterated over a N filter cycles.

The output filter map (OFMAP) 314 has an output data height (H) and an output data thickness of N.

The filter has a kernel width (Ky) a kernel height (Kx) a channel depth (D) and a number (N). The kernel width and kernel height form a kernel area (Ky×Kx). The addition of channel depth (D) changes the kernel area to a kernel volume (Ky×Kx×D), a number (N) is a collection of (Ky× Kx×D) kernel volumes.

Figure 4:
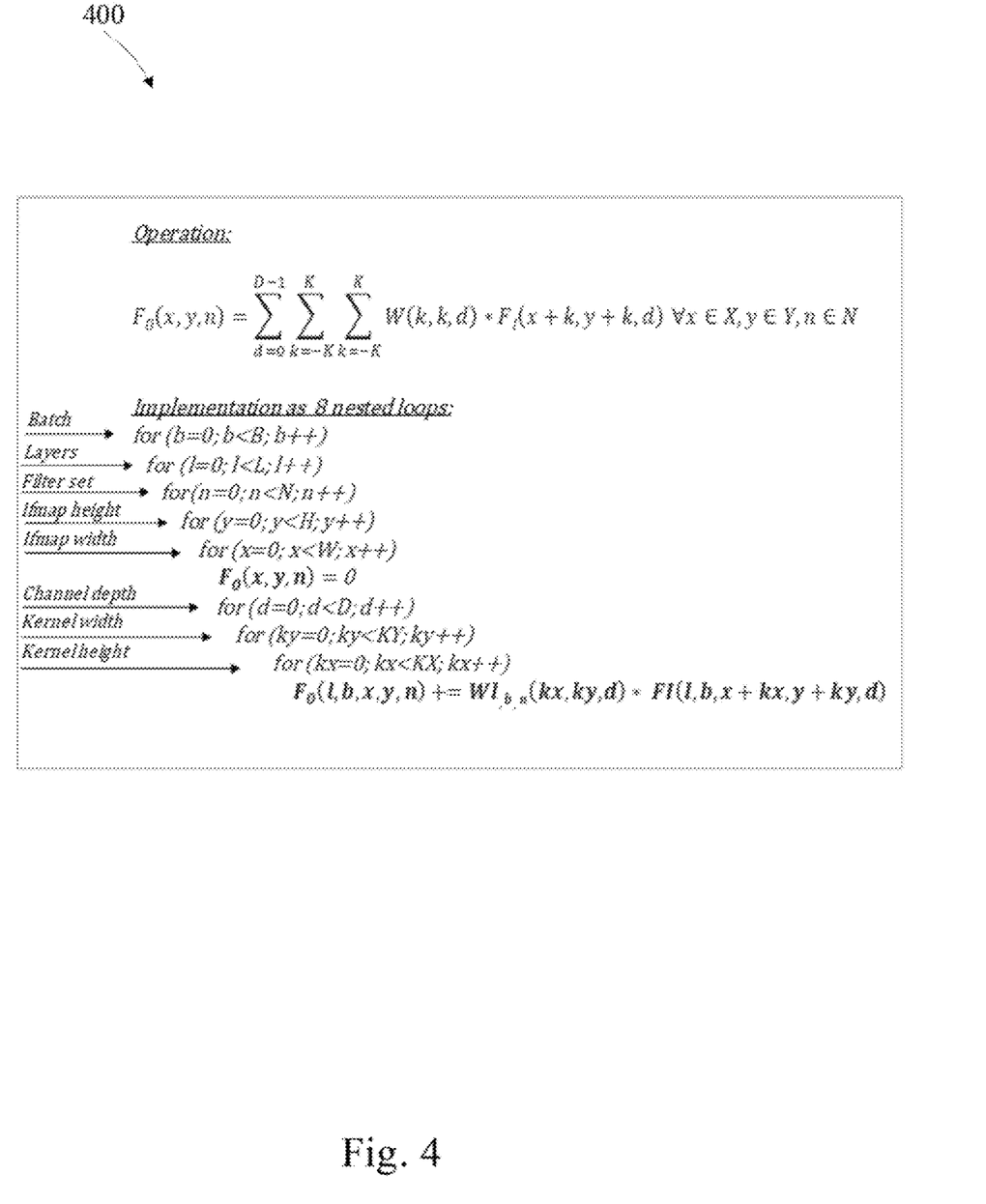
FIG. 4 is an example of a nested multiply accumulate in accordance with one embodiment of the disclosure.

FIG. 4 depicts an example of eight nested loops 400 to determine a multiply accumulate operation. The eight nested loops include summing a kernel height, summing a kernel width within the summation of the kernel height and summing a channel depth within the summation of the kernel width. The nested loops also include summing an activation data map width within the summation of the channel depth, summing an activation data map height within the summation of the activation data map width, summing a filter set within the summation of the activation data map height, summing a layer set within the summation of the filter set number and summing a batch within the summation of the layer set.

Figure 5:
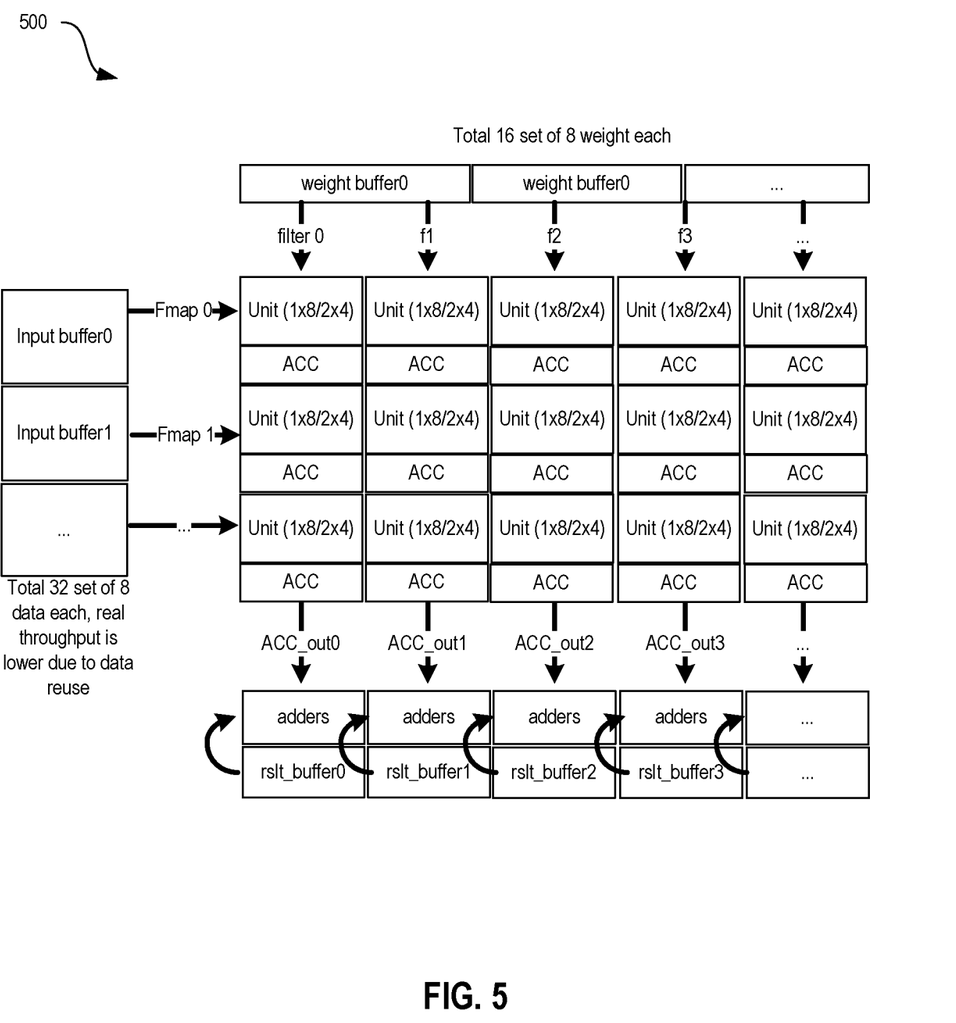
FIG. 5 is an example of the inputs and outputs of the adaptive multiply accumulate in accordance with one embodiment of the disclosure.

FIG. 5 depicts an example multiply accumulate operation 500 having as inputs input weight buffers and input activation data buffers, the multiply and accumulate cycles occur within the operation and then accumulation outputs are sent to adders and result buffers.

In one example, the activation data size may be 32×32× 32×32 (W×H×D×B) where the activation data area is 32 (W) by 32 (H) having a channel depth of 32 (D), giving the activation data a volume of 32×32×32 (D×W×H) and there are 32 batches (B) of activation data volume to consider.

The filter size may be 1×1×32×64 (Ky×Kx×D×N), where the filter width is 1, the filter height is 1, giving the kernel area as 1 (Ky) by 1 (Kx) and a channel depth (D), giving the kernel volume of 1×1×32 (Ky×Kx×D) and there are 64 (N) number of kernel volumes to consider.

A vector of 16 multipliers may be implemented in one dimension to fully utilize a MAP cycle. Within a 32×32× 32×32 (W×H×D×B), 16 multipliers applied to processing half of the 32 channel depth (D) dimension of the remaining portion of the activation data (W×H×B) in a cycle, the loop time of the channel depth is reduced from 32 to 2.

An array of two dimensional multipliers implemented as an array of 16×16 (D×N) multipliers applied to the 32×32× 32×32 (W×H×D×B) activation data may decrease the processing by half of the channel depth 32D and by three quarters of the Number 64N of the filter loop which is 1×1×32×64 (Ky×Kx×D×N), this implementation of two dimensional multipliers reduces the channel loop from 32 to 2 and filter set loop from 64 to 4.

The 1-D or 2-D approach may suffer utilization issues if the layer dimensions are not sufficiently large to take advantage of the reductions or if the layer dimensions are very large and require a many multipliers. For example, to process 4096 multiplies per cycle, either 4096 one dimensional multipliers (D) or 64×64 two dimensional multipliers (D×N) would be needed.

If the activation data and filter weights are the same, the efficient utilization of multipliers may present difficulties. In the previous example, when the array of 32D×64N is utilized, this provides a utilization which is half of the desired performance goal.

One possible solution to this problem is the use of an adaptive three dimensional 3D array of multipliers. Adaptive indicating that the shape of the 3D array of multipliers may be adjusted based on the shape of the layer.

In one example an array of 32×8×16 (W×D×N) may be utilized. If the activation data map width is not a multiple of 32, then the 32 (W) may be utilized to concurrently determine both the activation data map width (W) and activation data map height (H). In this situation (W×H) will unroll the (W×H) two loops into one loop and divide it by 32. This allows an activation data map width (W) of 16 by an activation data height (H) of 16, i.e. 16×16 (W×H) to be fully utilized.

In the example above of the adaptive array of 32×8×16 (W×D×N), the second dimension 8 (D) may cover the loops for D×Ky×Kx. In the case where the channel depth (D) is 4, which is common for a first convolution layer with RGBA having four channels, the adaptive 3D array may concurrently determine the 4 channel depth (D), and two of the 1× kernel width (Ky) and the 1× kernel height (Kx) to achieve full utilization.

FIG. 6 depicts an example method of constructing an adaptive multiply accumulate layer process 600 in a convolutional neural network. The method includes determining 610 an activation data map width, an activation data map height, a channel depth, a batch, a kernel width, a kernel height and a filter set number. The method then includes setting 612 a first dimension of an adaptive multiplier layer based on the activation data map width, setting 614 a second dimension of the adaptive multiplier layer based on the channel depth and setting 616 a third dimension of the adaptive multiplier layer based on the filter set number. Now having the three dimensions the method further includes constructing 618 the adaptive multiplier layer based on the first dimension, the second dimension and the third dimension. The first dimension may be ¼, ½ or equivalent to the size of the activation data map width. The second dimension may be ¼, ½ or equivalent to the size of the channel depth and the third dimension may be ¼, ½ or equivalent to the size of the filter set number.

The remaining portions of the multiply accumulate comprise summing a kernel height within the adaptive multiplier layer, summing a kernel width within the summation of the kernel height, summing an activation data map height within the summation of the kernel width, summing a layer set within the summation of the activation data map height and summing a batch with the summation of the layer set. The summing is a series of nested loops in which one set of summations is done within the next outer loop summation. As explained above if the size of the adaptive multiplication layer exceeds the dimension that it is multiplying then this allows concurrently summing the activation data map width and the activation data map height to yield a concurrent result and dividing the concurrent result by the activation data map width, and/or concurrently summing the channel depth, the kernel width and the kernel height.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of training a hybrid computational system to configure a three-dimensional (3D) multiplier array comprising a predetermined number of multipliers in a convolutional neural network, the hybrid computational system comprises a field programmable gate array, a graphical processor unit, a central processing unit, a memory interface, and a controller all connected to each other via a central interconnect, and is configured to perform the method steps comprising:
   determining a set of model data with a deterministic inference model using the graphical processor unit of the hybrid computational system;
   programming the field programmable gate array to perform the steps further comprising:
   determining activation data dimensions comprising an activation data map width, an activation data map height, a channel depth, and a batch number:
   determining dimensions of filter weights comprising Kernel width, Kernel height, Kernel depth, and filter number, wherein the Kernel depth matches the channel depth; and
   configuring the 3D multiplier array to increase a rate of utilization of multipliers when performing a multiply accumulate operation, wherein configuring the 3D multiplier array comprises:
      in response to determining that the activation data map width is not a multiple of a first dimension of the 3D multiplier array, configuring the first dimension of the 3D multiplier array to concurrently compute for the activation data map width and the activation data map height:
      configuring a second dimension of the 3D multiplier array to concurrently compute for the channel depth, the Kernel width, and the Kernel height; and
      configuring a third dimension of the 3D multiplier array to compute for the filter number.

2. The method of claim 1, further comprising:
   configuring the first dimension of the 3D multiplier array to be one of the following: one half, one fourth, and equivalent to a size of the activation data map width.

3. The method of claim 1, further configure:
   configuring the second dimension of the 3D multiplier array to be one of the following: one half, one fourth, and equivalent to a size of the channel depth.

4. The method of claim 1, further comprising:
   configuring the third dimension of the multiplier layer is one of the following: one half, one fourth, and equivalent to a size of the filter set number.

5. The method of claim 1, further comprising:
   summing a layer set within the summation of the activation data map height and
   summing a batch within the summation of the layer set.

6. The method of claim 5, further comprising concurrently summing the kernel height and the kernel width, wherein the kernel height and the kernel width are summed within one loop.

7. The method of claim 1, further comprising concurrently summing the kernel height and the kernel width, wherein the kernel height and the kernel width are summed within one loop.

8. The method of claim 1, further comprising:
   summing the channel depth within the summation of the kernel width;
   summing the activation data map width within the summation of the channel depth;
   summing a filter set within the summation of the activation data map height;
   summing a layer set within the summation of the filter set number; and
   summing a batch within the summation of the layer set.

9. The method of claim 8, further comprising:
   concurrently summing the activation data map width and the activation data map height to yield a concurrent result, wherein the activation data map width and the activation data map height are summed within one loop; and
   dividing the concurrent result by the activation data map width.

10. The method of claim 9, further comprising concurrently summing the channel depth, the kernel width and the kernel height, wherein the channel depth, the kernel width and the kernel height are summed within one loop.

11. The method of claim 1, wherein the memory and the interface controller are further connected to a persistent memory disk, a system memory, and a read only memory.

12. The method of claim 1, wherein the field programmable gate array is further connected to the memory interface via an interconnect from a programmable logic circuit to memory.

13. The method of claim 1, wherein the central interconnect is further connected to an input and output interface and a network interface.

14. The method of claim 1, wherein the field programmable gate array, the graphical processor unit, and the central processing unit are each capable of providing a neural net.

* * * * *